(12) United States Patent
Chen

(10) Patent No.: US 11,892,017 B1
(45) Date of Patent: Feb. 6, 2024

(54) MULTI-FUNCTIONAL CLAMP

(71) Applicant: DONG GUAN MYLAND INDUSTRY CO., LTD, Guangdong (CN)

(72) Inventor: Dongchang Chen, Guangdong (CN)

(73) Assignee: DONG GUAN MYLAND INDUSTRY CO., LTD, Guangdong (CN)

( * ) Notice: Subject to any disclaimer, the term of this patent is extended or adjusted under 35 U.S.C. 154(b) by 0 days.

(21) Appl. No.: 18/155,736

(22) Filed: Jan. 18, 2023

(30) Foreign Application Priority Data

Oct. 24, 2022 (CN) .......................... 202222809448.0

(51) Int. Cl.
*F16B 2/10* (2006.01)
(52) U.S. Cl.
CPC ...................... *F16B 2/10* (2013.01)
(58) Field of Classification Search
CPC ........................................................ F16B 2/10
See application file for complete search history.

(56) References Cited

U.S. PATENT DOCUMENTS

| | | | | |
|---|---|---|---|---|
| 2,917,800 | A * | 12/1959 | Gee ........................ | B44D 3/123 279/107 |
| 8,875,742 | B2 * | 11/2014 | Liao ........................ | F16B 2/10 138/91 |
| 9,358,008 | B2 * | 6/2016 | Mazzucco ............ | A61B 17/122 |
| 2011/0170246 | A1 * | 7/2011 | Chu ........................ | F16M 13/00 248/176.1 |
| 2011/0185545 | A1 * | 8/2011 | Reitzel ................... | F16B 45/00 24/510 |
| 2019/0193249 | A1 * | 6/2019 | Burnett ................... | B25B 5/12 |

* cited by examiner

*Primary Examiner* — Robert Sandy
(74) *Attorney, Agent, or Firm* — JCIPRNET

(57) ABSTRACT

The disclosure discloses a multi-functional clamp including a first clamping arm and a second clamping arm. A pressing part is disposed at a portion of the first clamping arm close to a hinge part, and a pressure receiving part is disposed at a portion of the second clamping arm close to the hinge part. The pressing part and the pressure receiving part are arranged oppositely, and a pressing structure is disposed on one surface of the pressing part facing the pressure receiving part, a pressure receiving structure is disposed on one surface of the pressure receiving part facing the pressing part. Extending arms are disposed at tail ends of the first clamping arm and the second clamping arm, and the extending arms of the first clamping arm and the second clamping arm are provided with protrusions. A clamping space is formed on an inner side of the protrusions.

7 Claims, 2 Drawing Sheets

MULTI-FUNCTIONAL CLAMP

CROSS-REFERENCE TO RELATED APPLICATION

This application claims the priority benefit of China application serial no. 202222809448.0, filed on Oct. 24, 2022. The entirety of the above-mentioned patent application is hereby incorporated by reference herein and made a part of this specification.

BACKGROUND

Technical Field

The disclosure relates to the technical field of auxiliary assembly tools for industrial products, in particular to a multi-functional clamp that may be used for assembling products such as lamps.

Description of Related Art

Covers are commonly adopted in many products such as toys, small lamps, and plugs, and one step in the assembly process is to put the cover on. At present, the operation of assembling a cover is mostly done manually. In order to prevent the cover from falling, the cover is generally designed to be closely matched with a main body, which requires a large pressing force to complete the assembly of the cover. For this reason, some auxiliary assembly tools have been developed to help complete the assembly operation. However, because different products require the use of covers in different forms, for example, most toys and lamps adopt gland seals, and most plugs adopt sliding covers, this causes the problem that one auxiliary assembly tool can only be used for one type of product. For example, one type of tool is used for gland seals, and another type of tool is used for sliding covers, which not only increases the cost of tools, but also increases the number of types of tools. As a result, it is not easy to implement management of tools, and assembly efficiency is lowered.

SUMMARY

The technical problem to be solved by the disclosure is to provide a multi-functional clamp with more reasonable structural design and more functions, which is suitable for both gland seals and sliding covers.

In order to solve the technical problem, the disclosure adopts the following technical solution. A multi-functional clamp includes a first clamping arm and a second clamping arm, and the first clamping arm and the second clamping arm are hinged to form a clamping structure that may be opened and closed. A pressing part is disposed at a portion of the first clamping arm close to a hinge part, and a pressure receiving part is disposed at a portion of the second clamping arm close to the hinge part. The pressing part and the pressure receiving part are arranged oppositely, a pressing structure is disposed on one surface of the pressing part facing the pressure receiving part, and a pressure receiving structure is disposed on one surface of the pressure receiving part facing the pressing part. Extending arms are disposed at tail ends of the first clamping arm and the second clamping arm, and the extending arms of the first clamping arm and the second clamping arm are provided with protrusions reaching out relative to each other. A concave clamping space for clamping a workpiece to be assembled is formed on an inner side of each of the protrusions.

Further, the pressing structure includes a pressing groove arranged on an inner surface of the pressing part and a pressing head arranged in the pressing groove, and the pressure receiving structure includes a pressure receiving groove arranged on an inner surface of the pressure receiving part and a pressure receiving head arranged in the pressure receiving groove. The pressure receiving head and the pressing head reach out relative to each other, and a space for assembling the workpiece is formed between the pressure receiving head and the pressing head. During operation, the bottom of the workpiece may be placed in the pressure receiving groove, and the pressure receiving head abuts against the workpiece. Then a gland seal may be placed on the top of the workpiece, and the pressing head may be used to abut against the gland seal. The first clamping arm and the second clamping arm are held to apply force so as to press the gland seal into the workpiece. Of course, some workpieces may also be placed in reverse for operation.

Further, a curved first connector is provided in front of the pressing part, and the first connector is connected to the pressing part as an integral structure. A curved second connector is provided in front of the pressure receiving part, and the second connector is connected to the pressure receiving part as another integral structure. The first clamping arm and the second clamping arm are hinged together through a pivot pin passing through the first connector and the second connector.

Further, a first docking arm is provided at a front end of the first connector, a second docking arm is provided at a front end of the second connector, the first docking arm and the second docking arm are docked with each other and are hinged together through a pivot pin inserted therebetween.

Moreover, a protruding first position-limiting part is provided at a front end of the first docking arm, and a protruding second position-limiting part is provided at a front end of the second docking arm. Position-limiting structures are formed of the first position-limiting part and the second position-limiting part respectively to limit positions of the first clamping arm and the second clamping arm when they are opened, thereby preventing the first clamping arm and the second clamping arm from being opened too widely.

Furthermore, an extending arm is arranged on each of two sides of the tail ends of the first clamping arm and the second clamping arm, and a protrusion is provided on the inner side of a distal end of each extending arm, so that the two protrusions of the first clamping arm and two protrusions of the second clamping arm are aligned with each other. By pressing against one end of the workpiece through the protrusions of the second clamping arm, and pressing one end of a sliding cover through the protrusions of the first clamping arm, and by pressing the first clamping arm and the second clamping arm, the assembly of the sliding cover may be easily completed.

Moreover, holes are provided at main body parts of the first clamping arm and the second clamping arm, and a skeleton is arranged in each of the holes. The skeleton and the main body of the clamping arm are integrally structured so as to increase the strength of the clamping arm while reducing the weight of the clamping arm.

Furthermore, middle segments of the first clamping arm and the second clamping arm are arc-shaped concave structures, so that tail segments of the first clamping arm and the second clamping arm form tilted structures, which makes it easy for applying force when holding by hand.

The disclosure provides a pressing structure close to the front end and a pressing structure at the tail end. In this way, not only is it possible to perform operation on cover products, but it is also possible to perform operation on sliding cover products. Accordingly, the present disclosure has broader adaptability and more functions, thus improving the convenience of use and increasing work efficiency, while reducing the number of tools and decreasing costs.

DESCRIPTION OF THE EMBODIMENTS

Figure 1:
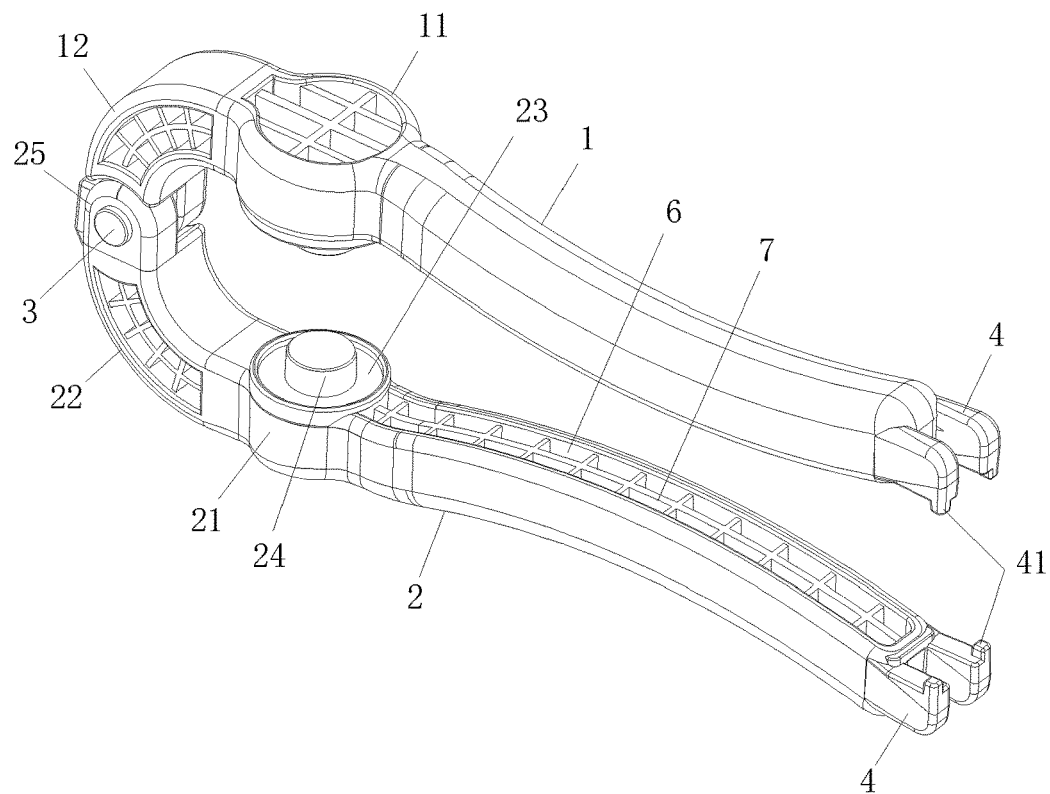
FIG. 1 is a structural view of the present disclosure.
Figure 2:
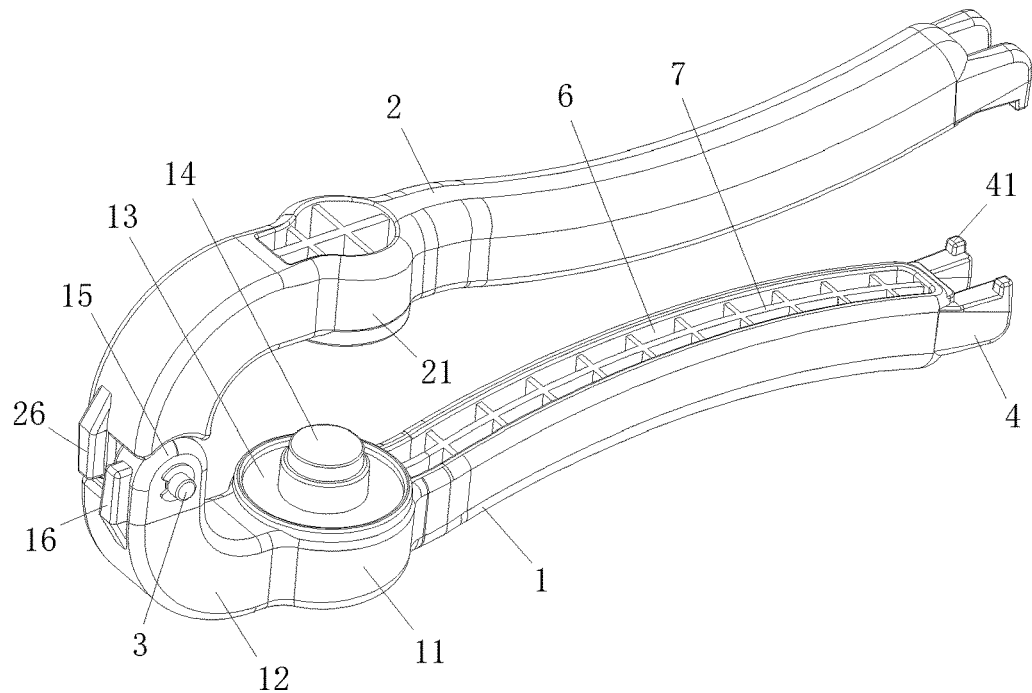
FIG. 2 is a structural view of the present disclosure viewed from another viewing angle.
Figure 3:
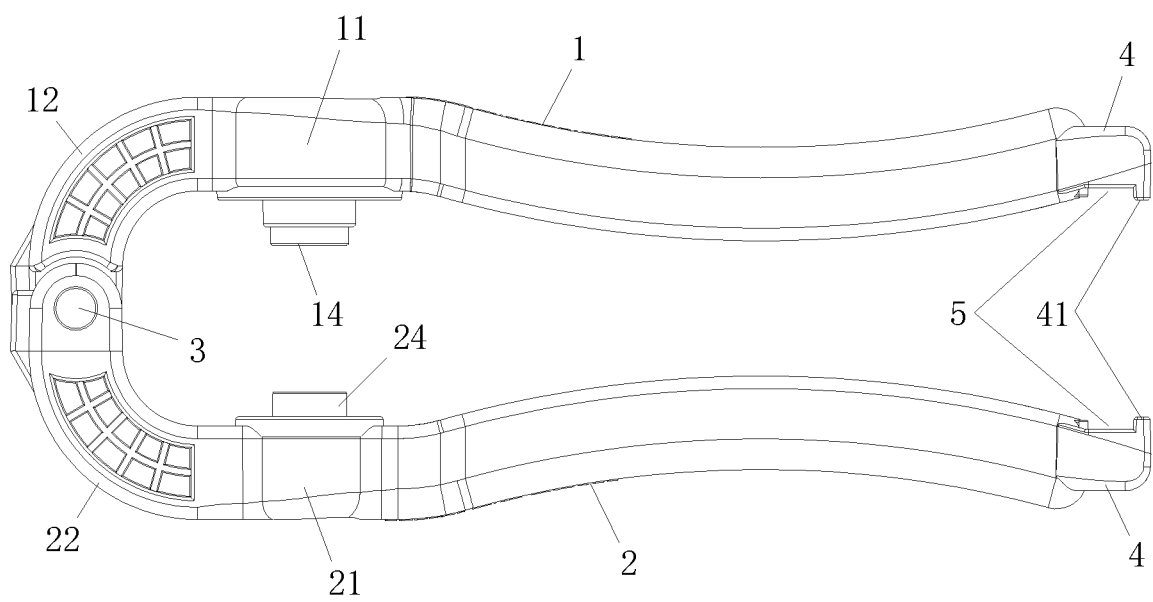
FIG. 3 is a side view of the structure of the present disclosure.

In the embodiment, referring to FIG. 1 to FIG. 3, a multi-functional clamp includes a first clamping arm 1 and a second clamping arm 2, and the first clamping arm 1 and the second clamping arm 2 are hinged to form a clamping structure that may be opened and closed. A pressing part 11 is disposed at a portion of the first clamping arm 1 close to a hinge part, and a pressure receiving part 21 is disposed at a portion of the second clamping arm 2 close to the hinge part. The pressing part 11 and the pressure receiving part 21 are arranged oppositely, and a pressing structure is disposed on one surface of the pressing part 11 facing the pressure receiving part 21, a pressure receiving structure is disposed on one surface of the pressure receiving part 21 facing the pressing part 11. Extending arms 4 are disposed at tail ends of the first clamping arm 1 and the second clamping arm 2, and the extending arms 4 of the first clamping arm 1 and the second clamping arm 2 are provided with protrusions 41 reaching out relative to each other. A concave clamping space 5 for clamping a workpiece to be assembled is formed on the inner side of the protrusions 41.

The pressing structure includes a pressing groove 13 arranged on an inner surface of the pressing part 11 and a pressing head 14 arranged in the pressing groove 13, and the pressure receiving structure includes a pressure receiving groove 23 arranged on an inner surface of the pressure receiving part 21 and a pressure receiving head 24 arranged in the pressure receiving groove 23. The pressure receiving head 24 and the pressing head 14 reach out relative to each other, and a space for assembling the workpiece is formed between the pressure receiving head 24 and the pressing head 14. During operation, the bottom of the workpiece may be placed in the pressure receiving groove 23, and the pressure receiving head 24 abuts against the workpiece. Then a gland seal may be placed on the top of the workpiece, and the pressing head 14 may be used to abut against the gland seal. The first clamping arm 1 and the second clamping arm 2 are held to apply force so as to press the gland seal into the workpiece. Of course, some workpieces may also be placed in reverse for operation.

A curved first connector 12 is provided in front of the pressing part 11, and the first connector 12 is connected to the pressing part 11 as an integral structure. A curved second connector 22 is provided in front of the pressure receiving part 21, and the second connector 22 is connected to the pressure receiving part 21 as another integral structure. The first clamping arm 1 and the second clamping arm 2 are integrally structured and hinged together through a pivot pin 3 passing through the first connector 12 and the second connector 22.

A first docking arm 15 is provided at a front end of the first connector 12, a second docking arm 25 is provided at a front end of the second connector 22, the first docking arm 15 and the second docking arm 25 are docked with each other and are hinged together through a pivot pin 3 inserted therebetween.

A protruding first position-limiting part 16 is provided at a front end of the first docking arm 15, and a protruding second position-limiting part 26 is provided at a front end of the second docking arm 25. Position-limiting structures are formed of the first position-limiting part 16 and the second position-limiting part 26 respectively to limit the positions of the first clamping arm 1 and the second clamping arm 2 when they are opened, thereby preventing the first clamping arm 1 and the second clamping arm 2 from being opened too widely.

An extending arm 4 is arranged on each of two sides of the tail ends of the first clamping arm 1 and the second clamping arm 2, and a protrusion 41 is provided on an inner side of a distal end of each extending arm 4, so that the two protrusions 41 of the first clamping arm 1 and two protrusions 41 of the second clamping arm 2 are aligned with each other. By pressing against one end of the workpiece through the protrusions 41 of the second clamping arm 2, and pressing one end of a sliding cover through the protrusions 41 of the first clamping arm 1, and by pressing the first clamping arm 1 and the second clamping arm 2, the assembly of the sliding cover can be easily completed.

Holes 6 are provided at the main body parts of the first clamping arm 1 and the second clamping arm 2, and a skeleton 7 is arranged in each of the holes 6. The skeleton 7 and the main body of the clamping arm are integrally structured so as to increase the strength of the clamping arm while reducing the weight of the clamping arm.

Middle segments of the first clamping arm 1 and the second clamping arm 2 are arc-shaped concave structures, i.e., a recess is formed in the middle segment, so that tail segments of the first clamping arm 1 and the second clamping arm 2 form tilted structures, which makes it easy for applying force when being held by hand and not easily slipped out of the hand.

The present disclosure has been described in detail as above. The above description is only a preferred embodiment of the present disclosure, and does not limit the scope of the present disclosure. All equivalent changes and modifications made according to the scope of the present disclosure should still belong to the scope covered by the present disclosure.

What is claimed is:

1. A multi-functional clamp, comprising a first clamping arm and a second clamping arm, wherein the first clamping arm and the second clamping arm are hinged to form a clamping structure, the clamping structure is capable of being opened and closed, wherein a pressing part is disposed at a portion of the first clamping arm close to a hinge part, and a pressure receiving part is disposed at a portion of the second clamping arm close to the hinge part; the pressing part and the pressure receiving part are arranged oppositely, a pressing structure is disposed on one surface of the pressing part facing the pressure receiving part, and a pressure receiving structure is disposed on one surface of the pressure receiving part facing the pressing part; extending arms are disposed at tail ends of the first clamping arm and the second clamping arm, the extending arms of the first clamping arm and the second clamping arm are provided with protrusions reaching out relative to each other, and a concave clamping space for clamping a workpiece to be assembled is formed on an inner side of each of the protrusions, wherein the pressing structure comprises a pressing groove arranged on an inner surface of the pressing part and a pressing head arranged in the pressing groove, and the pressure receiving structure comprises a pressure receiving groove arranged on an inner surface of the pressure receiving part and a pressure receiving head arranged in the pressure receiving groove; the pressure receiving head and the pressing head reach out relative to each other, and a space for assembling the workpiece is formed between the pressure receiving head and the pressing head.

2. The multi-functional clamp according to claim 1, wherein a curved first connector is provided in front of the pressing part, and the first connector is connected to the pressing part as an integral structure, a curved second connector is provided in front of the pressure receiving part, and the second connector is connected to the pressure receiving part as another integral structure; the first clamping arm and the second clamping arm are hinged together through a pivot pin passing through the first connector and the second connector.

3. The multi-functional clamp according to claim 2, wherein a first docking arm is provided at a front end of the first connector, a second docking arm is provided at a front end of the second connector, the first docking arm and the second docking arm are docked with each other and are hinged together through the pivot pin inserted between the first docking arm and the second docking arm.

4. The multi-functional clamp according to claim 3, wherein a protruding first position-limiting part is provided at a front end of the first docking arm, and a protruding second position-limiting part is provided at a front end of the second docking arm, position-limiting structures are formed of the first position-limiting part and the second position-limiting part respectively to limit positions of the first clamping arm and the second clamping arm when the first clamping arm and the second clamping arm are opened.

5. The multi-functional clamp according to claim 1, wherein an extending arm of each of the extending arms of the first clamping arm and the second clamping arm is arranged on each of two sides of the tail ends of the first clamping arm and the second clamping arm, and a protrusion of each of the protrusions provided on the first clamping arm and the second clamping arm is provided on an inner side of a distal end of each of the extending arms, so that two of the protrusions of the first clamping arm are aligned with two of the protrusions of the second clamping arm.

6. The multi-functional clamp according to claim 1, wherein holes are provided at main body parts of the first clamping arm and the second clamping arm, and skeletons are arranged in the holes to increase a strength of the first clamping arm and the second clamping arm.

7. The multi-functional clamp according to claim 1, wherein middle segments of the first clamping arm and the second clamping arm are arc-shaped concave structures, so that tail segments of the first clamping arm and the second clamping arm form tilted structures.

\* \* \* \* \*